(12) United States Patent
Miyazaki et al.

(10) Patent No.: US 6,714,648 B2
(45) Date of Patent: Mar. 30, 2004

(54) IC CARD EQUIPPED WITH ELLIPTIC CURVE ENCRYPTION PROCESSING FACILITY

(75) Inventors: Seiji Miyazaki, Higashimurayama (JP); Kazuo Takaragi, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/252,669

(22) Filed: Sep. 24, 2002

(65) Prior Publication Data

US 2003/0021410 A1 Jan. 30, 2003

Related U.S. Application Data

(63) Continuation of application No. 09/236,590, filed on Jan. 26, 1999, now Pat. No. 6,466,668.

(30) Foreign Application Priority Data

Jan. 28, 1998 (JP) ............................................. 10-015376

(51) Int. Cl.[7] .............................. H04L 9/28; H04L 9/30; H04L 9/00
(52) U.S. Cl. .......................... 380/30; 380/263; 713/172
(58) Field of Search ............................ 350/28, 30, 263; 718/781; 713/172

(56) References Cited

U.S. PATENT DOCUMENTS

| | | |
|---|---|---|
| 5,463,690 A | 10/1995 | Crandall |
| 5,627,893 A | 5/1997 | Demytko |
| 5,764,554 A | 6/1998 | Monier |
| 5,793,659 A | 8/1998 | Chen et al. |
| 5,912,904 A * | 6/1999 | Monier ........................ 714/781 |
| 5,948,051 A | 9/1999 | Monier |
| 5,999,626 A | 12/1999 | Mullin et al. |
| 6,088,453 A | 7/2000 | Shimbo |
| 6,141,420 A | 10/2000 | Vanstone et al. |
| 6,178,507 B1 | 1/2001 | Vanstone |
| 6,266,688 B1 | 7/2001 | Aoki et al. |
| 6,275,837 B1 | 8/2001 | Plessier |
| 6,466,668 B1 * | 10/2002 | Miyazaki et al. ............. 380/30 |

FOREIGN PATENT DOCUMENTS

EP 801345 A1 4/1997

OTHER PUBLICATIONS

Menez,;Applied Cryptography; 1996; CRC press LLC; pp. 607–608 and 632.*
Burton; Elementry number theory; 1989; Brown Publishers; second edition; pp. 31, 226 and 305.*

(List continued on next page.)

*Primary Examiner*—Gilberto Barron
*Assistant Examiner*—Kambiz Zand
(74) *Attorney, Agent, or Firm*—Mattingly, Stanger & Malur, P.C.

(57) ABSTRACT

In an IC card incorporating residual multiplier hardware for implementing a high-speed algorithm for a residual multiplication arithmetic, a method and a device capable of executing a public key encryption processing such as an elliptic curve encryption processing at a high speed. Residual arithmetic succeeding to generation of a random number and residual arithmetic in a signature generating processing can be executed by using a residual multiplier. Further, in order to use effectively the residual multiplier for arithmetic operation on an elliptic curve, the point on the elliptic curve is transformed from a two-dimensional affine coordinate system to a three-dimensional coordinate system. Additionally, multiplicative inverse arithmetic for realizing reverse transformation from the three-dimensional coordinate system to the two-dimensional affine coordinate system as well as for determining a signature s can be executed only with the residual multiplication arithmetic. By making use of the residual multiplier in this manner, the processing speed can be increased. Computation complexity can be reduced by storing previously those parameters which are used frequently and constant multiplies of a base point of the elliptic curve in the form of tables, which also contributes to increasing of processing speed.

6 Claims, 7 Drawing Sheets

OTHER PUBLICATIONS

Denning; Cryptography and data security; 1982; Addison–Wesely publishing company, inc; p. 42.*

Struif, B., "The Use of Chipcards for Electronic Signatures and Encryption" IEEE, vol. Conf. 3, May 8, 1989, pp. 4–155–158.

Miyaji, A., "Elliptic Curves Suitable for Cryptosystems", IEICE, vol. E77–A, No. 1, 1994, pp. 98–104.

Sedlak, H. et al., "An RSA Cryptography Processor",.

The Art of Computer Programming, vol. 2, Addison–Wesley, 1969, "Seminumerical Algorithms Arithmetic", D.E. Knuth.

Nikkei Electronics, No. 732, Dec. 14, 1998, pp. 27–28.

Communications of the ACM, vol. 21, No. 2, Feb. 1978, "A Method for Obtaining Digital Signatures and Public–Key Cryptosystems", R.L. Rivest et al.

D.V. Chudnovsky et al, "Sequences of Numbers Generated by Addition in Forma Groups and New Primality and Factorization Tests", Advances in Applied Mathematics, vol. 7, 1986, pp. 385–434.

A. Shimbo, "Applications of Montgomery Arithmetics to Elliptic Curve Encryption", SCIS, 1997, (The 1997 Symposium on Cryptography and Informatio Security).

Chae Hoon Lim and Hyo Sun Hwang, Fast Modular Reduction With Precomputation 1997, Pohang University of Science & Technology, pp. 1–15.

Antoon Bosselaers, Rene Govarets and Joos Vandewalle; Comparison of Three Modular Reduction Functions 1994, Katholieke Universitteit Leuven, pp. 175–186.

\* cited by examiner

IC CARD EQUIPPED WITH ELLIPTIC CURVE ENCRYPTION PROCESSING FACILITY

This is a continuation application of U.S. Ser. No. 09/236,590, filed Jan. 26, 1999 now U.S. Pat. No. 6,466,668.

BACKGROUND OF THE INVENTION

The present invention relates generally to an IC card (integrated circuit card) capable of processing encryption data or information. More particularly, the invention is concerned with a method capable of executing at a high speed elliptic curve encryption processing in an encryption processing in which hardware designed for executing a high-speed algorithm for a residual multiplication arithmetic (multiplication on the set of integers) is adopted and a device such as an IC card in which the above-mentioned method is adopted.

For having better understanding of the present invention, technical background thereof will first be described in some detail. As an encryption scheme for a public key cryptosystem, there is known an RSA encryption scheme which was invented by Rivest, Shamir and Adleman in 1978. The basic principle underlying the RSA encryption will be reviewed below.

Basic Principle of RSA Encryption

Representing a secret key by (d, n), a public key by (e, n), a plaintext by M and a co-processor by c, respectively, then the encryption and the decryption can be represented, respectively, by the calculation formulae mentioned below.

Encryption: $C \equiv M^e \pmod{n}$, and decryption: $M \equiv C^d \pmod{n}$.

In the above expressions, n is given by p·q where p and g represent large prime numbers, respectively which satisfy the conditions that $\lambda(n) = LCM\{(p-1), (q-1)\}$ (where LCM represents a least common multiple), $GCD\{e, \lambda(n)\} = 1$ (where GCD represents a greatest common divisor), and that $d = e^{-1} \mod \lambda(n)$.

The security of the RSA encryption is ensured by the fact that it is very difficult to factorize n into prime factors. In this conjunction, it is recommended to employ large integers on the order of 1024 bits as the parameters such as e, d, n, M and so forth. In that case, modular multiplication on the set of integers (hereinafter referred to also as the residual multiplication arithmetic) has to be conducted 1534.5 times on an average for a single processing in accordance with the encryption formula $C \equiv M^e \pmod{n}$, when such a binary operation method is resorted to, which is described in detail in D. E. Knuth: "SEMINUMERICAL ALGORITHMS ARITHMETIC", The Art of Computer Programming, Vol. 2, Addison-Wesley, 1969.

Furthermore, as another encryption scheme belonging to the public key crypto-system, there may be mentioned an elliptic curve encryption processing proposed by Koblitz and Miller independently in 1985. The basic principle underlying this elliptic curve encryption will be reviewed below.

Principle of the Elliptic Curve Encryption

Representing the order of a finite field by a prime number p while representing by a and b the parameters which determine the elliptic curve, a set which includes a set of points capable of satisfying the conditions given by the undermentioned expression and which is added with a virtual point at infinity is referred to as the elliptic curve Ep. For the convenience of illustration, the elliptic curve Ep of concern is presumed to be capable of being represented on the affine coordinate system.

Ep: $y^2 \equiv x^3 + ax + b \pmod{p}$

Addition between two points $P_1$ and $P_2$ on the elliptic curve, i.e., $P_3 = P_1 + P_2$ (where $P_i = (x_i, y_i)$), can be defined as follows:

Case where $P_1 \neq P_2$

In this case, the arithmetics as involved will hereinafter be referred to as the elliptic addition arithmetic.

The elliptic addition arithmetic includes addition performed zero times, subtraction performed six times, multiplication performed twice and division performed once, as follows:

$\lambda = (y_2 - y_1)/(x_2 - x_1)$, $x_3 = \lambda^2 - x_1 - x_2$, and $y_3 = \lambda(x_1 - x_3) - y_1$ Case where $P_1 = P_2$ In this case, the arithmetic will hereinafter be referred to as the elliptic by-two-multiplication arithmetic.

The elliptic by-two-multiplication arithmetic includes addition performed once, subtraction performed three times, multiplication performed three times and division performed once, as follows:

$\lambda = (3 \times 12 + a)/2y_1$, $x_3 = \lambda^2 - 2 \times 1$ and $y_3 = \lambda(x_1 - x_3) - y_1$ At this juncture, it should be mentioned that all the arithmetic operations mentioned above are performed on a residue system to modulus p.

The security of the elliptic curve encryption described above is based on the fact that when a point derived through multiplication of a point A on the elliptic curve by x (i.e., the point obtained by adding "A" x times) is represented by $B(=x \cdot A)$, extreme difficulty will be encountered in finding the value of x on the basis of the values of the points A and B if known. This feature is known as the elliptic curve discrete logarithm problem. In order to ensure the security comparable to that realized by the 1024-bit RSA encryption described previously, it is recommended that each of the parameters such as p, a, $x_i$, $y_i$, etc. be an integer on the order of 160 bits.

The arithmetic operation for determining the point (k·P) corresponding to multiplication of a point P by k, which constitutes one of the basic arithmetic operations for the elliptic curve encryption, can be realized by computation in accordance with the addition on the elliptic curve (elliptic curve addition) mentioned above. In this conjunction, it is noted that the modular division on the set of integers (hereinafter also referred to as the residual division arithmetic) has to be conducted in order to determine λ. The residual division arithmetic (i.e., modular division on the set of integers) can generally be coped with by resorting to an algorithm such as an extended Euclidean algorithm or the like, which requires, however, lots of processing times. Such being the circumstances, there is widely adopted the method or scheme for realizing the arithmetics on the elliptic curve by transforming a point on a two-dimensional affine coordinate system into a point on a three-dimensional coordinate system without resorting to the residual division arithmetic processing. For more particulars of this scheme, reference may be made to D. V. Chudnovsky and G. V. Chudnovsky:

"SEQUENCES OF NUMBERS GENERATED BY ADDITION IN FORMAL GROUPS AND NEW PRIMALITY AND FACTORIZATION TESTS", Advances in Applied Mathematics, Vol. 7, pp. 385–434, 1986. By way of example, when the addition arithmetics on the elliptic curve Ep in the two-dimensional affine coordinate system is transformed into addition arithmetics in the three-dimensional projective coordinate system so that the conditions given by $x \equiv X/Z^2$ (mod p) and $y \equiv Y/Z^3$ (mod p) can be satisfied, the addition arithmetics are defined as follows:

The elliptic addition arithmetic includes addition performed twice, subtraction performed five times, multiplication performed sixteen times and division performed zero times, as follows:

$$X_3 = R^2 - TW^2,$$

$$2Y_3 = VR - MW^3,$$

and $$Z_3 = Z_1 Z_2 W$$

where $$W = X_1 Z_2^2 - X_2 Z_1^2,$$

$$R = Y_1 Z_2^3 - Y_2 Z_1^3,$$

$$T = X_1 Z_2^2 + X_2 Z_1^2,$$

$$M = Y_1 Z_2^3 - Y_2 Z_1^3,$$

and $$V = TW^2 - 2X_3.$$

The elliptic by-two-multiplication arithmetic includes addition performed once, subtraction performed three times, multiplication performed ten times and division performed zero times, as follows:

$$X_3 = M^2 - 2S,$$

$$Y_3 = M(S - X_3) - T,$$

and $$Z_3 = 2Y_1 Z_1$$

where $$M = 3X_1^2 + aZ_1^4,$$

$$S = 4X_1 Y_1^2,$$

and $$T = 8Y_1^4$$

At this juncture, it should be mentioned that all the arithmetic operations mentioned above are performed on a residue system to modulus p.

As another example of the coordinate transformation methods, there may be mentioned a coordinate transformation to a three-dimensional homogeneous coordinate system such that the conditions given by the following expressions can be satisfied.

$$x \equiv X/Z \pmod{p},$$

and $$y \equiv Y/Z \pmod{p}$$

At this juncture, it should however be noted that the residual division arithmetic (i.e., division on the set of integers) has to be executed once upon reverse transformation from the three-dimensional coordinate system to the two-dimensional coordinate system.

Assuming, by way of example, that a 160-bit elliptic curve encryption is transformed to that on the three-dimensional projective or mapping coordinate system, and that the k·P arithmetic is realized by using the binary operation scheme mentioned hereinbefore, the residual multiplication arithmetic will have to be performed as many times as 2862 times on an average.

As will now be appreciated from the foregoing description, in the public key encryption scheme such as the RSA encryption method and the elliptic curve encryption method, lots of residual multiplication arithmetic processings (i.e., modular multiplications on the set of integers) are required as the basic arithmetic operation. Such being the circumstances, there have been developed and proposed methods or schemes for speeding up the residual multiplication arithmetic by resorting to a high-speed algorithm for the residual multiplication arithmetic, to thereby speed up the encryption processing on the whole.

In particular, in the RSA encryption scheme, the arithmetic operations therefor are in large part the residual multiplication arithmetic. Thus, there has been realized such hardware designed for executing the high-speed algorithm for the residual multiplication arithmetic. Further, the IC card capable of executing the RSA encryption processing at a high speed has been realized by employing such hardware so as to meet the stipulation of the IC Card Standards ISO7816.

SUMMARY OF THE INVENTION

By contrast, in the case of the elliptic curve encryption scheme, residual four-rules arithmetics are required as the basic arithmetic operations. Among the residual four-rules arithmetics, the residual division arithmetic requires lots of processing time, which presents a serious problem to the approach for speeding up the elliptic curve encryption processing. Parenthetically, a method or scheme for decreasing the number of times the residual division arithmetic has to be executed in the elliptic curve encryption processing and a scheme for speeding up the residual division arithmetic have already been proposed in A. Shimbo: "APPLICATION OF MONTGOMERY ARITHMETICS TO ELLIPTIC CURVE ENCRYPTION", SCIS, 1997 (The 1997 Symposium on Cryptography and Information Security). However, it is noted that attempt for applying the methods disclosed in the above literature to the devices such as the IC card stipulated in the Standards ISO7816 will unavoidably limited in view of the present state of the semiconductor technology. Thus, lot of time will be taken for the multiplicative inverse arithmetic operation in the residual division arithmetic, making it difficult to enhance the processing speed.

Accordingly, in the light of the state of the art described above, it is an object of the present invention to provide a method capable of executing at a high speed the elliptic curve encryption processing in an encryption processing in which hardware designed for executing a high-speed algorithm for the residual multiplication arithmetic is adopted.

Another object of the invention is to provide a device such as an IC card in which the above-mentioned method is adopted.

Yet another object of the present invention is to provide a method capable of executing at a high speed the digital signature processing in a device such as, e.g. an IC card, in which hardware designed for executing a high-speed algorithm for the residual multiplication arithmetic (i.e., modular multiplication on the set of integers) is adopted.

Still another object of the invention is to provide a device such as an IC card in which the method mentioned just above is adopted.

It is a further object of the present invention to provide a method capable of speeding up the multiplicative inverse arithmetic in the residual division arithmetic (i.e., modular division on the set of integers) in the elliptic curve encryption processing.

It is also an object of the present invention to provide a device in which the method mentioned just above is adopted.

In view of the above and other objects which will become apparent as the description proceeds, there are provided according to aspects of the present invention undermentioned scheme or arrangements for carrying out the invention.

At first, according to an aspect of the present invention which is directed to a device such as, for example, an IC card, which includes hardware for executing a high-speed algorithm for the residual multiplication arithmetics (hereinafter the hardware will be referred to as the residual multiplier), there is provided an elliptic curve encryption processing method in which arithmetic operations involved in the elliptic curve encryption processing are realized largely by the residual multiplication arithmetics (i.e., modular multiplication on the set of integers) so that the residual multiplier can be utilized effectively.

More specifically, the residual arithmetics performed in succession to generation of random numbers required for the elliptic curve encryption processing and the residual arithmetics involved in the signature generation processing are so structurized as to be capable of being executed by using the residual multiplier. Furthermore, in order to make it possible to utilize effectively the residual multiplier for the elliptic curve arithmetics, the residual division arithmetic (i.e., modular division on the set of integers) involved in the elliptic curve addition arithmetic is transferred into the residual multiplication arithmetic by transforming points on an elliptic curve in the two-dimensional affine coordinate system into those in a three-dimensional coordinate system, wherein the residual multiplication arithmetic is executed by making use of the residual multiplier.

According to another aspect of the present invention which is directed to the scheme for speeding up the multiplicative inverse arithmetic, the multiplicative inverse arithmetics required not only in the coordinate system transformation from the three-dimensional coordinate system to the two-dimensional affine coordinate system but also in generating the signature data are realized by resorting to the residual multiplication arithmetic (i.e., modular multiplication on the set of integers). The multiplicative inverse arithmetic for the residue system is ordinarily realized by making use of algorithm such as extended Euclidean algorithm. However, in the case where modulus to the residue or remainder is prime number, the multiplicative inverse arithmetic can be realized by using only the residual multiplication arithmetic without need for relying on the algorithm such as the extended Euclidean algorithm. This will be elucidated below.

According to the Fermat's theorem, the statement given by the undermentioned expression can apply valid to a positive integer $\alpha$ which is relatively prime to a prime number $\beta$:

$$\alpha^{\beta-1} \equiv 1 \pmod{\beta}$$

According to this theorem, the multiplicative inverse arithmetic "$\alpha^{-1} \mod \beta$" can be expressed as follows:

$$\alpha^{-1} \equiv \alpha^{\beta-2} \pmod{\beta}$$

According to an aspect of the present invention, the values of the order p of a finite field and the order n of a base point are represented by prime numbers of large values, respectively, so that the condition for fulfilling the Fermat's theorem mentioned above, i.e., the condition that the prime number $\beta$ and the positive integer a are relatively prime, can always be satisfied. Accordingly, the value or quantity $\alpha^{-1}$ mod $\beta$ is equal to the quantity $\alpha^{\beta-2}$ mod $\beta$. Thus, assuming, by way of example, that the residual multiplication arithmetic is performed by resorting to the binary operation method, the value of multiplicative inverse, i.e., $\alpha^{-1}$ mod $\beta$, can be determined by performing the residual multiplication arithmetic by a number of times given by $((|\beta-2|-1)\times 3/2)$, where $|\beta-2|$ represents bit number of $(\beta-2)$. By adopting the method mentioned above, it is also possible to reduce the program size or scale because of no necessity of preparing the algorithm such as Euclidean algorithm or the like as a program(s).

In an arrangement according to another aspect of the present invention, those parameters which are used very frequently in the arithmetic operations and which can be calculated beforehand with a personal computer or the like are previously determined to be stored as one of system information in a rewritable nonvolatile memory incorporated in the IC card. Thus, computational complexity of the arithmetic processing can be reduced. In this conjunction, as the data to be stored previously in the rewritable nonvolatile memory as the system information, there may be mentioned order p of a finite field, values "aR mod p" resulting from transformation of elliptic curve parameter a, point (X, Y, Z) which can be obtained by transforming two-dimensional affine coordinates (x, y) of a point P (base point) on the elliptic curve into coordinates in a three-dimensional projective coordinate system, which coordinates are then transformed to be appropriate for a residual multiplication arithmetic unit, order n of the base point, secret key d, values "2R mod p", "3R mod p", "4R mod p", "8R mod p" and "$2^{-1}$R mod p" resulting from transformation of constants, respectively, which are employed in the elliptic curve arithmetics, and values "R mod p", "R mod n", "$R^2$ mod p" and "$R^2$ mod n" employed in the residual multiplication arithmetic. In the above description, R represents a positive integer which satisfies the condition that R=2|p|, where |p| represents the bit number of the order p of the finite field.

According to yet another aspect of the present invention, there is provided an IC card in which points corresponding to integer multiples of the base point are stored in a rewritable nonvolatile memory incorporated in the IC card in the form of tables with a view to reducing the computation overhead by decreasing the number of processings involved in the elliptic curve addition arithmetics. In this conjunction, it should be mentioned that the computational overhead can be reduced as the number of the table increases. However, the amount of data (i.e., data size) to be stored in the rewritable nonvolatile memory will then increase correspondingly. Accordingly, it is also taught by the invention that points obtained by exponentiation of the base points by four are stored in the memory in the form of tables. In that case, the number of the points stored as the tables, i.e., the number of tables, is given by |p|/2, where |p| represents the bit number of the order p of the finite field. The tabled values are transformed into coordinates on a three-dimensional projective coordinate system and then transformed to points given by $P_i(X_i, Y_i, Z_i)$ suited for arithmetics executed by the residual multiplier. In the expression mentioned just above, i represents an integer satisfying the condition that $0 \leq i < |p|/2$.

In the case where the large memory capacity is available, the points resulting from exponentiation of the base points by two may be stored as tables. In that case, the arithmetic operations on the elliptic curve may be structurized only with the elliptic addition arithmetics, whereby the number of processings as required can be reduced.

In general, when the values of points resulting from $2^n$ (where n represents a natural number) of the base points are stored as tables, the number of the tables is given by $|p|/n$, where $|p|$ represents the bit number of order p of the finite field. In practical applications, the number of the tables may be determined by taking into account the computation performance of a CPU and the capacity of a memory destined for storing the tables.

Other subjects, features and advantages of the present invention will become apparent from the following detailed description of the embodiments taken in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiment thereof by reference to the drawings. In the following description, like reference characters designate like or corresponding parts throughout the several views.

Figure 1:
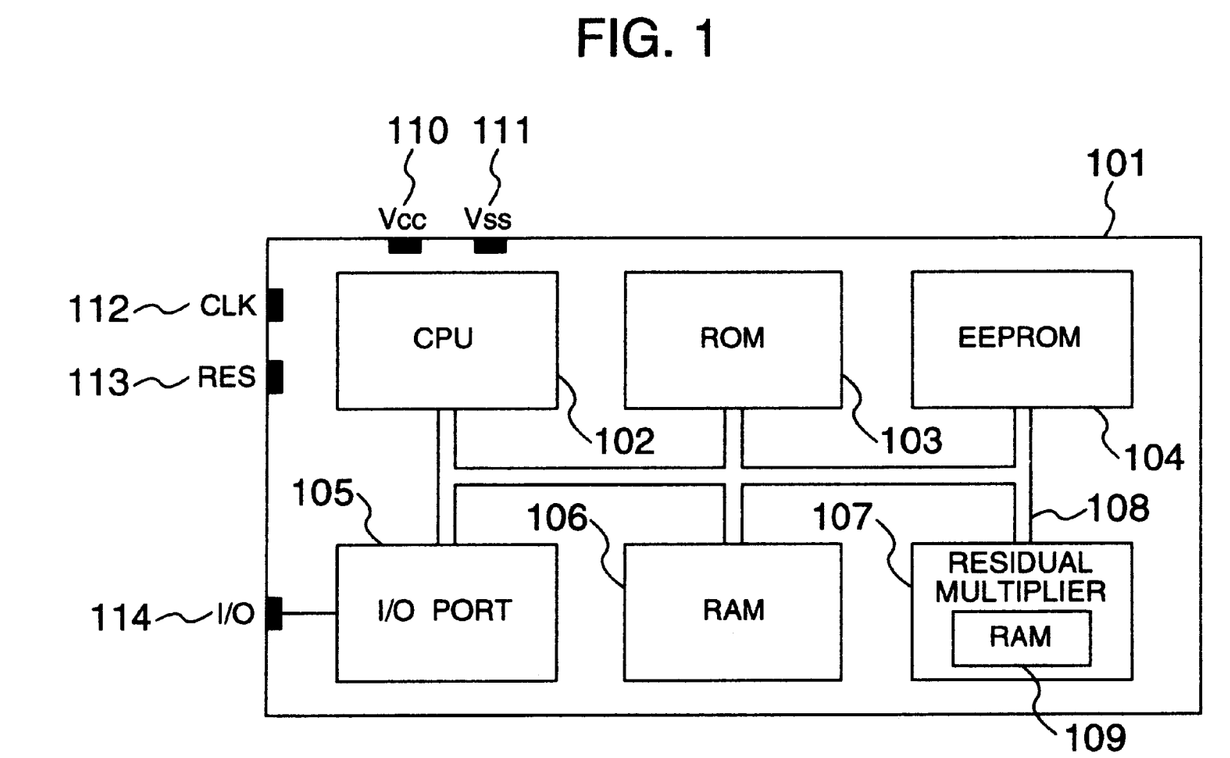
FIG. 1 is a schematic block diagram showing generally an arrangement of a device to which the present invention can find application.

FIG. 1 is a schematic block diagram showing generally an arrangement of a digital signature system which is incorporated in an IC card by making use of a microcomputer such as, for example, a microcomputer of H8/3111-model commercially available from Hitachi, Ltd. and in which addition arithmetic on the elliptic curve in a finite field is employed. Referring to FIG. 1, the IC card denoted generally by reference numeral 101 includes a CPU (Central Processing Unit) 102, a ROM (Read-Only Memory) 103 destined for storing operation instructions involved in carrying out the present invention, an EEPROM (Electrically Erasable and Programmable Read-Only Memory) 104 serving as a rewritable nonvolatile memory for storing system information and data such as the finite field orders, elliptic curve parameters and the like, an I/O (input/output) port 105 for controlling input/output to/from the IC card 101, a RAM (Random Access Memory) 106, a residual multiplier 107 capable of executing or performing the residual multiplication arithmetic (modular multiplication on a set of integers), a power supply terminal (Vcc) 110, a ground terminal (Vss) 111, a clock terminal (CLK) 112, a reset terminal (RES) 113 and an I/O (input/output) terminal (I/O) 114. The individual terminals of the IC card 101 are electrically connected to relevant components incorporated in the IC card 101. The above-mentioned residual multiplier 107 which is designed for performing residual multiplication arithmetic may be constituted by a co-processor of the Hitachi Microcomputer Model H8/3111 mentioned above. Of course, other equivalent co-processor can be employed to this end.

The residual multiplier 107 mentioned above incorporates a CPU/residual-multiplier-shared RAM 109 which can be used in common by both the residual multiplier 107 and the CPU 102, wherein the RAM 109 includes at least three data registers CDA, CDB and CDN. Arithmetic operations performed by the residual multiplier 107 are executed with input data being stored in the data registers CDA, CDB and CDN, respectively. In that case, the result of the arithmetic operation carried out by the residual multiplier 107 is stored in the data register CDA by rewriting the value thereof. In this conjunction, it should however be noted that the values of the data registers CDB and CDN remain unchanged after the arithmetic operation. Further, it should be mentioned that the residual multiplier 107 is so designed as to be capable of executing or performing any given one of the three types of arithmetic operations mentioned below in response to a command designating the operation type.

Namely,

CDA←(CDA·CDB) $R^{-1}$ mod (CDN) (hereinafter referred to as the residual arithmetic 1), CDA←(CDA$^2$) $R^{-1}$ mod (CDN) (hereinafter referred to as the residual arithmetic 2), and CDA←(CDA) $R^{-1}$ mod (CDN) (hereinafter referred to as the residual arithmetic 3).

The individual elements or components incorporated in the IC card 101 such as mentioned previously are interconnected through the medium of a bus 108.

Furthermore, representing by a prime number p the order of an finite field, the elliptic curve Ep employed in carrying out the present invention can be represented by a set corresponding to a set of points which can satisfy the undermentioned expression for the parameters (a, b) which determine the elliptic curve and added with a virtual point at infinity. For the convenience's sake, the elliptic curve Ep of concern is presumed to be represented on the affine coordinate system.

$$Ep: y^2x^3 + ax + b \pmod{p}$$

Furthermore, the base point is represented by P(x, y), the order of which is represented by a prime number n.

(1) Storage of System Information

Stored in the EEPROM 104 are order p of a finite field, value "aR mod p" resulting from transformation of elliptic curve parameter a, point $P_i(X_i, Y_i, Z_i)$ (where i represents an integer satisfying the condition that $0 \leq i < |p|/2$ with $|p|$ representing bit number of a finite field order p) which can be obtained by transforming two-dimensional affine coordinates (x, y) of a point P (base point) on the elliptic curve into coordinates in a three-dimensional projective coordinate system, which coordinates are then transformed to be proper to the residual multiplication arithmetic unit, order n of the base point, secret key d, values "2R mod p", "3R mod p", "4R mod p", "8R mod p" and "$2^{-1}$R mod p" resulting from transformation of constants, respectively, which are employed in the elliptic curve arithmetics, and values "R mod p", "R mod n", "$R^2$ mod p" and "$R^2$ mod n" used in the residual multiplication arithmetic. In the above statement, R represents a positive integer which satisfies the conditions that R>p and that R>n, e.g. a smallest positive integer which has a bit length equal to a greater one of either $|p|+1$ or $|n|+1$. Storage of the system information is performed before the encryption processings described below are executed. Parenthetically, in the above statements, R assumes a numerical value given as a constant and represents a parameter determined in dependence on the arithmetic performance of, by way of example, the co-processor which constitutes or serves as a multiple length arithmetic unit.

(2) Generation of Digital Signature

FIGS. 2 to 7 are flow charts for illustrating a processing procedure for generation of a digital signature which is performed by the elliptic curve encryption processing unit according to the instant embodiment of the present invention. At first, the signature generation procedure will be described generally by reference to FIG. 2.

Figure 2:
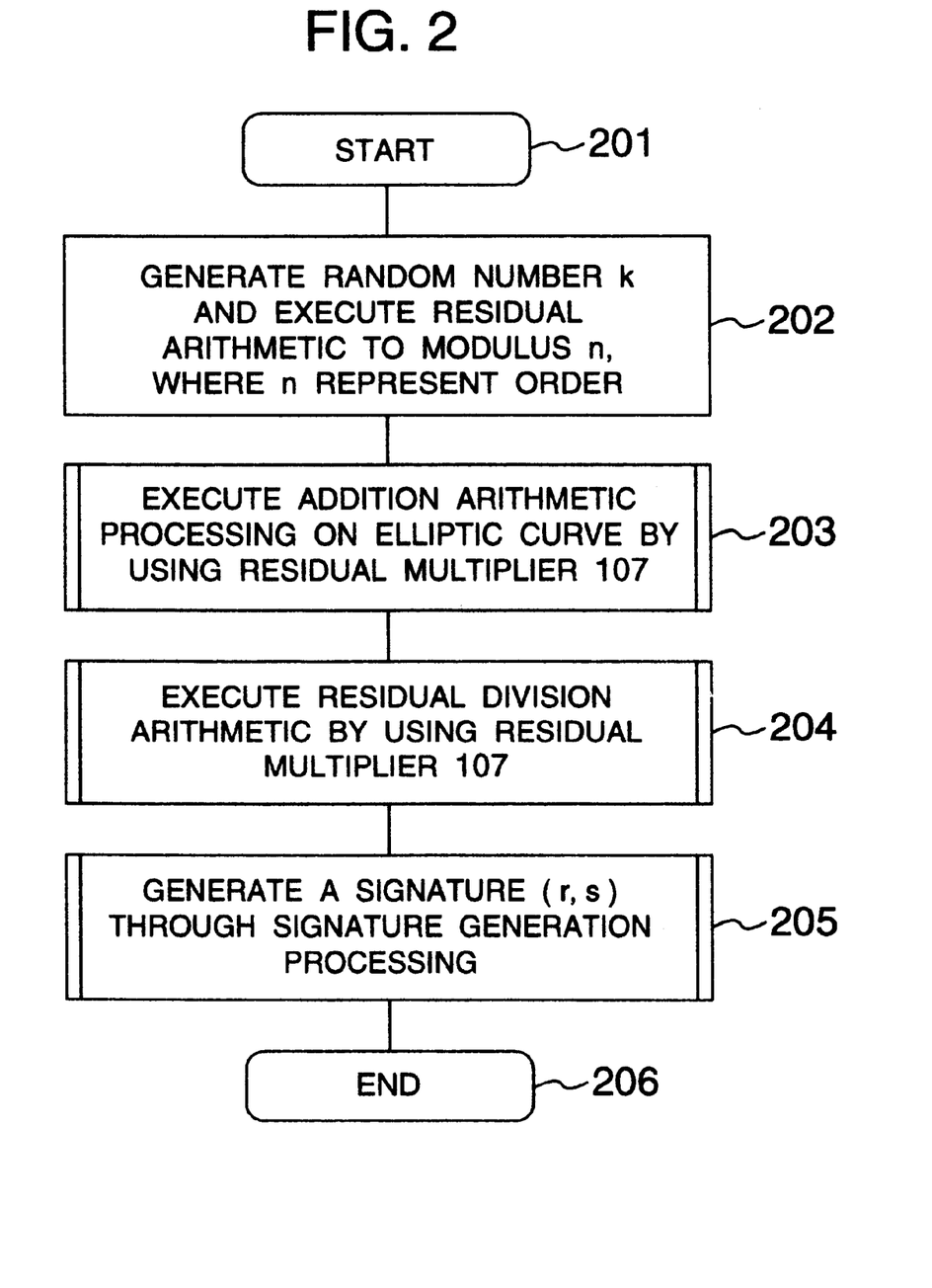
FIG. 2 is a flow chart for illustrating a signature generation procedure based on the elliptic curve encryption method according to an embodiment of the invention.

In the flow charts referenced in the following description, it is presumed that the CPU 102 executes the program stored in the ROM 103 while allowing the residual multiplier 107 to execute the relevant processing by using the data stored in the RAM 106 and the EEPROM 104, as occasion requires.

Step 201: Processing procedure is started.

Step 202: A random number k is generated, whereon the random number k as generated is stored in the data register CDA incorporated in the residual multiplier 107 while the value "R mod n" stored in the EEPROM 104 is set or placed in the data register CDB equally incorporated in the residual multiplier 107, for thereby allowing the residual multiplier 107 to execute the residual arithmetic 1 defined previously. The result of execution as stored currently in the data register CDA is set as the updated or renewed random number k.

Step 203: The random number k generated in the step 202, the system information p, value "aR mod p" and the point coordinates data P(X, Y, Z) stored in the EEPROM 104 are inputted to execute the calculation k·P, i.e., multiplication of the base point P on the elliptic curve by the random number k. This calculation can be achieved by performing elliptical addition arithmetic on the finite field in the three-dimensional projective coordinate system, i.e., scalar multiple arithmetic by means of the CPU 102. In that case, the residual multiplication arithmetic involved in the elliptical addition arithmetic can be carried out by using the residual multiplier 107 which is constituted by the co-processor, as mentioned previously.

Step 204: The point coordinate data (X, Y, Z), i.e., the result of execution in the step 203, represents a point in the three-dimensional projective coordinate system, as mentioned above. Accordingly, the point coordinate data (X, Y, Z) has to be transformed into a point coordinate (x, y) on the two-dimensional affine coordinate system. The arithmetic operation for this coordinate transformation can be represented by $x \equiv X/Z^2$ (mod p). However, the arithmetic operation given by $x \equiv XZ^{p-3}$ (mod p) can be carried out to this end, because the formula $x \equiv X \cdot Z^{p-3}$ (mod p) can apply valid in view of the Fermat's theorem. Thus, in place of the residual division arithmetic, the residual multiplication arithmetic (i.e., $x \equiv XZ^{p-3}$ (mod p)) is carried out with the aid of the residual multiplier 107. In this manner, by using the formula $x \equiv XZ^{p-3}$ (mod p) instead of the formula $x \equiv X/Z^2$ (mod p), the coordinate transformation can be realized only with the residual multiplication arithmetic without resorting to the residual division arithmetic.

Step 205: By using the random number k generated in the step 202, the hash value H(M) for the message M inputted by way of the I/O port 105 from the I/O terminal (I/O) 114, the secret key d stored in the EEPROM 104, the order n of the base point and the value or quantity "x mod p" calculated in the step 204, the arithmetic operations mentioned below are carried out.

For generation of signature r, r≡x (mod n), and for generation of signature s, $s \equiv k^{-1} \cdot (H(M)+d \cdot r)$ (mod n).

The arithmetic operation for generating the signature s in the above-mentioned arithmetic operations requires the multiplicative inverse arithmetic. This multiplicative inverse arithmetic can be realized by replacing the residual division arithmetic given by "$k^{-1}$ mod n" by the residual multiplication arithmetic "$k^{n-2}$ mod n", as in the case of the processing in the step 204. As readily appreciated, the residual multiplication arithmetic "$k^{n-2}$ mod n" can be realized with the residual multiplier 107. The result of this arithmetic operation represents a signature (r, s) which is outputted as the digital signature for the message M by way of the I/O port 105 from the I/O terminal (I/O) 114.

Step 206: The processing comes to an end.

Next, description will be turned to a processing procedure for generation of the digital signature according to the instant embodiment of the invention by reference to FIG. 3 to FIG. 7.

Figure 3:
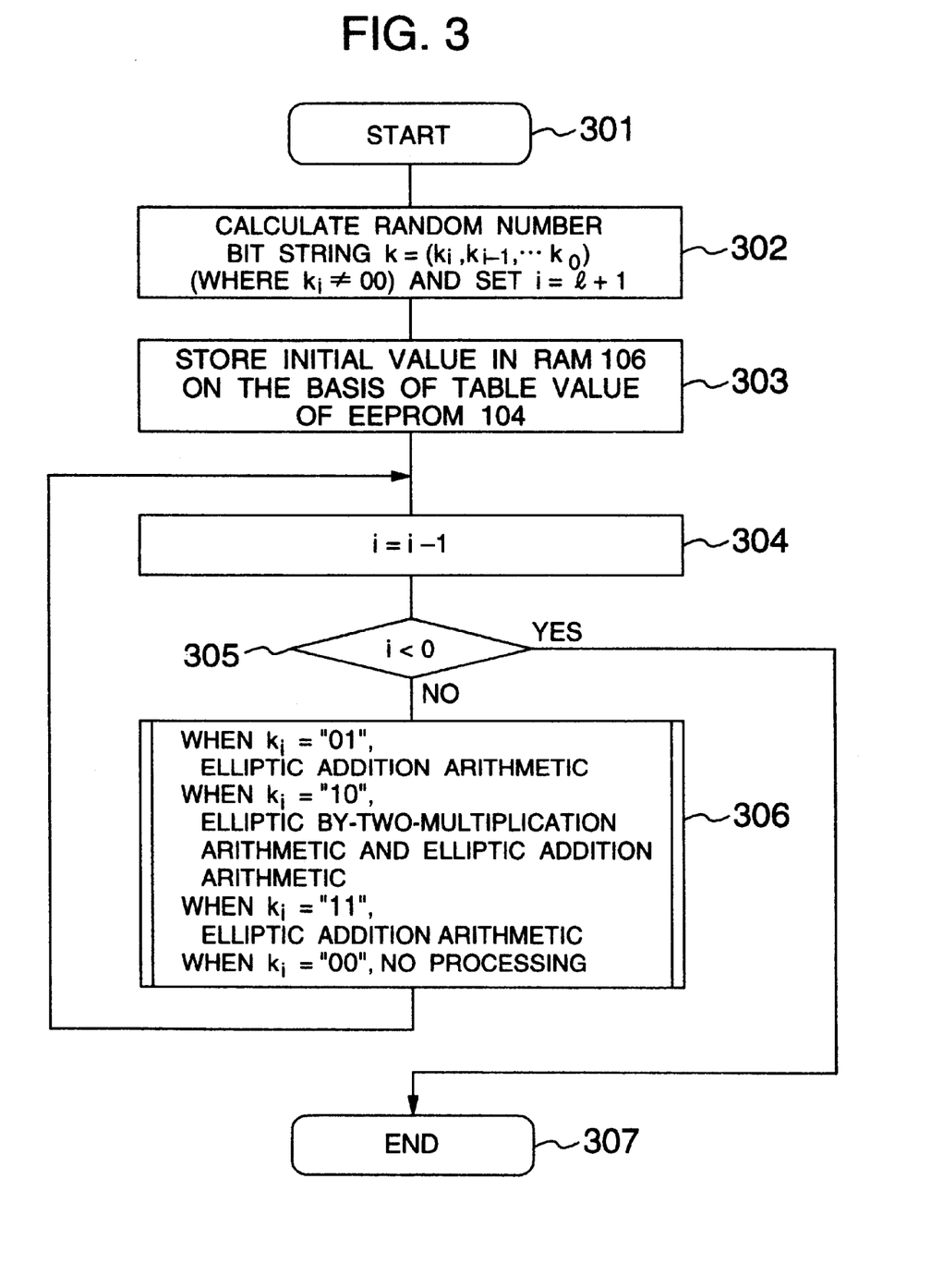
FIG. 3 is a flow chart for illustrating in detail a sequence of processings in a step 203 shown in FIG. 2.

FIG. 3 is a flow chart for illustrating in detail the processing in the step 203 shown in FIG. 2. In the following, contents of the processings in the individual steps shown in FIG. 3 will be described.

Step 301: Processing procedure is started.

Step 302: A bit string $k=(k_i, k_{i-1}, \ldots, k_1, k_0)_2$ of the random number k generated in the step 202 is determined by combining bits of binary notation on a two-by-two bit basis and the bit string is scanned, starting from the least significant bit side. When $k_i$="11", the more significant bit string $k_{i+1}$ than $k_i$ is added with "01". In this manner, the bit string is rewritten up to the most significant bit. Thus, when the original bit string is represented, for example, by "10", "11", "10", "11", then the bit string after the transformation will be "01", "11", "00", "11", "11". This transformation is performed up to the most significant bit. The resultant bit string is represented by $$k=(k_l, k_{l-1}, \ldots, k_1, k_0)_2, \text{ where } k_l \neq (00).$$

The value of l as obtained is set to the variable i (hereinafter referred to as the loop counter) as the number of times (l+1) the residual multiplication arithmetic is to be repeated.

Step 303: On the basis of a point $P_i(X_i, Y_i, Z_i)$ transformed for the residual multiplication arithmetic after the three-dimensional coordinate transformation of the base point, i.e., a table value, on the elliptic curve which had been stored in the EEPROM 104, as described previously, initial value is stored in the RAM 106 to rewrite the random number $k_i$ for the point $P_i$.

Step 304: The loop counter value i is decremented by one.

Step 305: Decision is made as to the loop counter value i. If the loop counter value i is smaller than 0 (zero), then the processing proceeds to a step 309 and, if otherwise, to a step 306.

Step 306: If the value of the random number $k_i$ is "00", the step 304 is resumed. If the value of the random number $k_i$ is "01", then the elliptic addition arithmetic for adding the table value $P_i$ is performed, whereupon the step 304 is resumed. When the value of the random number $k_i$ is "10", then the elliptic by-two-multiplication arithmetic is performed by multiplying the table value $P_i$ by two and subsequently the elliptic addition arithmetic is performed for adding the result of the elliptic by-two-multiplication arithmetic, whereon the step 304 is resumed. On the other hand, when the value of the random number $k_i$ is "11", the additive inverse for the arithmetic operation to modulus p is determined for the Y-coordinate value of the table value $P_i$ to be placed renewally as the Y-coordinate of the table value $P_i$, and the elliptic addition arithmetic is performed for adding the relevant point, whereupon the step 304 is resumed.

Step 307: The processing comes to an end.

Figure 4:
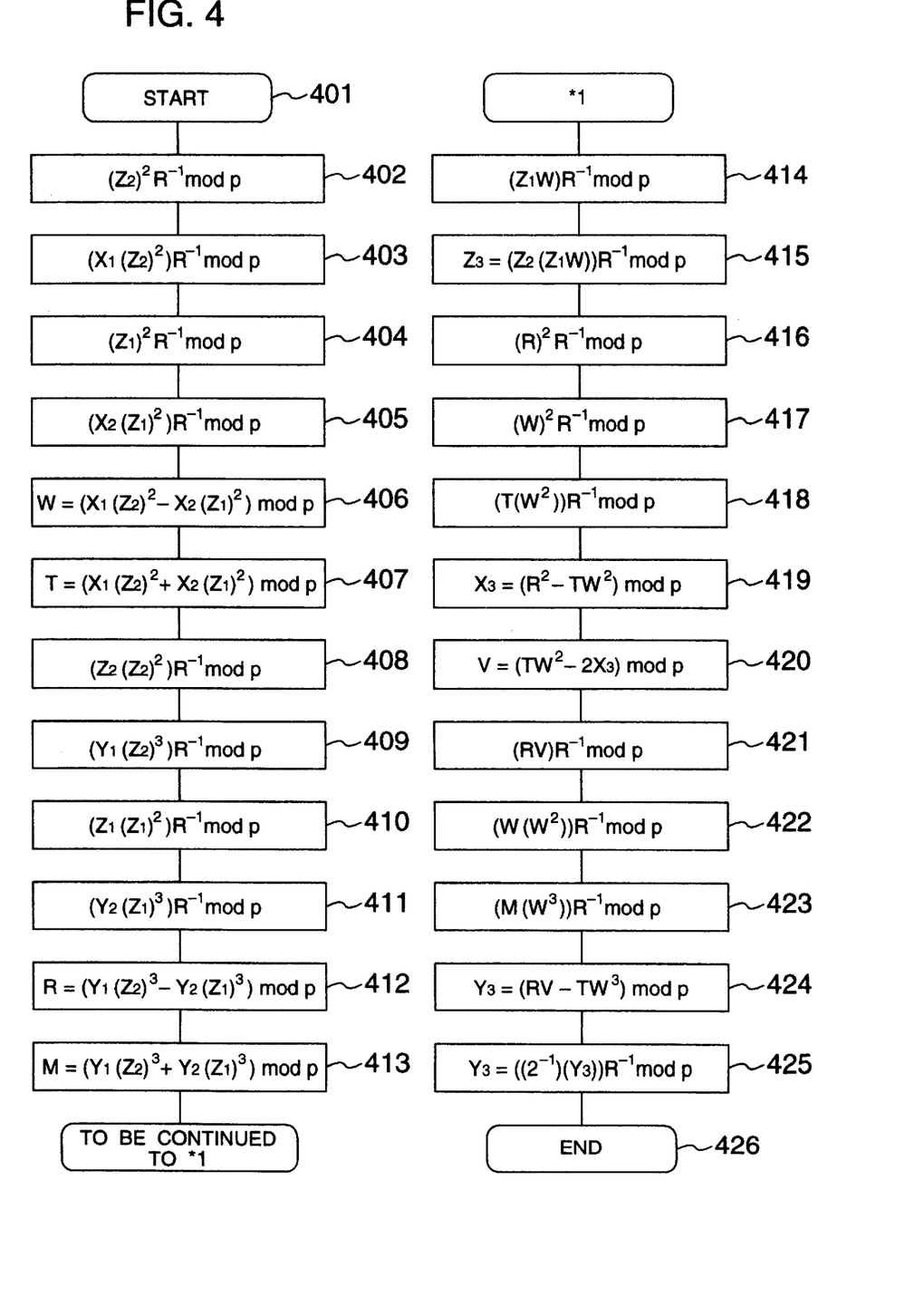
FIG. 4 is a flow chart for illustrating in detail an elliptic addition arithmetic in the processing procedure shown in FIG. 3.

FIG. 4 is a flow chart for illustrating in detail the elliptic addition arithmetic in the processing procedure described hereinbefore by reference to FIG. 3. In the following, processing contents in the individual steps shown in FIG. 4 will be described.

Step 401: Processing procedure is started. In this conjunction, it should be mentioned that since p is stored in the register CDN of the residual multiplier 107 in the step 303, residual multiplication arithmetic is performed to modulus p (i.e., modulo p).

Step 402: The residual arithmetic 2 defined hereinbefore is executed by using the residual multiplier 107.

Step 403: The residual arithmetic 1 defined hereinbefore is executed by using the residual multiplier 107.

Step 404: The residual arithmetic 2 is executed by using the residual multiplier 107.

Step 405: The residual arithmetic 1 is executed by using the residual multiplier 107.

Step 406: The CPU 102 performs the residual subtraction arithmetic (i.e., modular subtraction on the set of integers) to thereby derive an interim value W.

Step 407: The CPU 102 performs the residual addition arithmetic to thereby derive an interim value T.

Step 408: The residual arithmetic 1 is executed by using the residual multiplier 107.

Step 409: The residual arithmetic 1 is executed by using the residual multiplier 107.

Step 410: The residual arithmetic 1 is executed by using the residual multiplier 107.

Step 411: The residual arithmetic 1 is executed by using the residual multiplier 107.

Step 412: The CPU 102 performs the residual subtraction arithmetic (i.e., modular subtraction on the set of integers) to thereby derive an interim value R.

Step 413: The CPU 102 performs the residual addition arithmetic (i.e., modular addition on the set of integers) to thereby derive an interim value M.

Step 414: The residual arithmetic 1 is executed by using the residual multiplier 107.

Step 415: The residual arithmetic 1 is executed by using the residual multiplier 107, whereby the Z-coordinate of a point determined after the elliptic addition arithmetic can be obtained.

Step 416: The residual arithmetic 2 is executed by using the residual multiplier 107.

Step 417: The residual arithmetic 2 is executed by using the residual multiplier 107.

Step 418: The residual arithmetic 1 is executed by using the residual multiplier 107.

Step 419: The CPU 102 performs the residual subtraction arithmetic, whereby the X-coordinate of a point determined after the elliptic addition arithmetic can be obtained.

Step 420: The CPU 102 performs the residual subtraction arithmetic to derive an interim value V.

Step 421: The residual arithmetic 1 is executed by using the residual multiplier 107.

Step 422: The residual arithmetic 1 is executed by using the residual multiplier 107.

Step 423: The residual arithmetic 1 is executed by using the residual multiplier 107.

Step 424: The CPU 102 performs the residual subtraction arithmetic to thereby derive an interim value Y.

Step 425: The interim value Y and value "$2^{-1}R$ mod p" stored in the EEPROM 104 are inputted to the residual multiplier 107 to realize the residual arithmetic 1, whereby the Y-coordinate of the point determined after the elliptic addition arithmetic can be obtained.

Step 426: The processing comes to an end.

Figure 5:
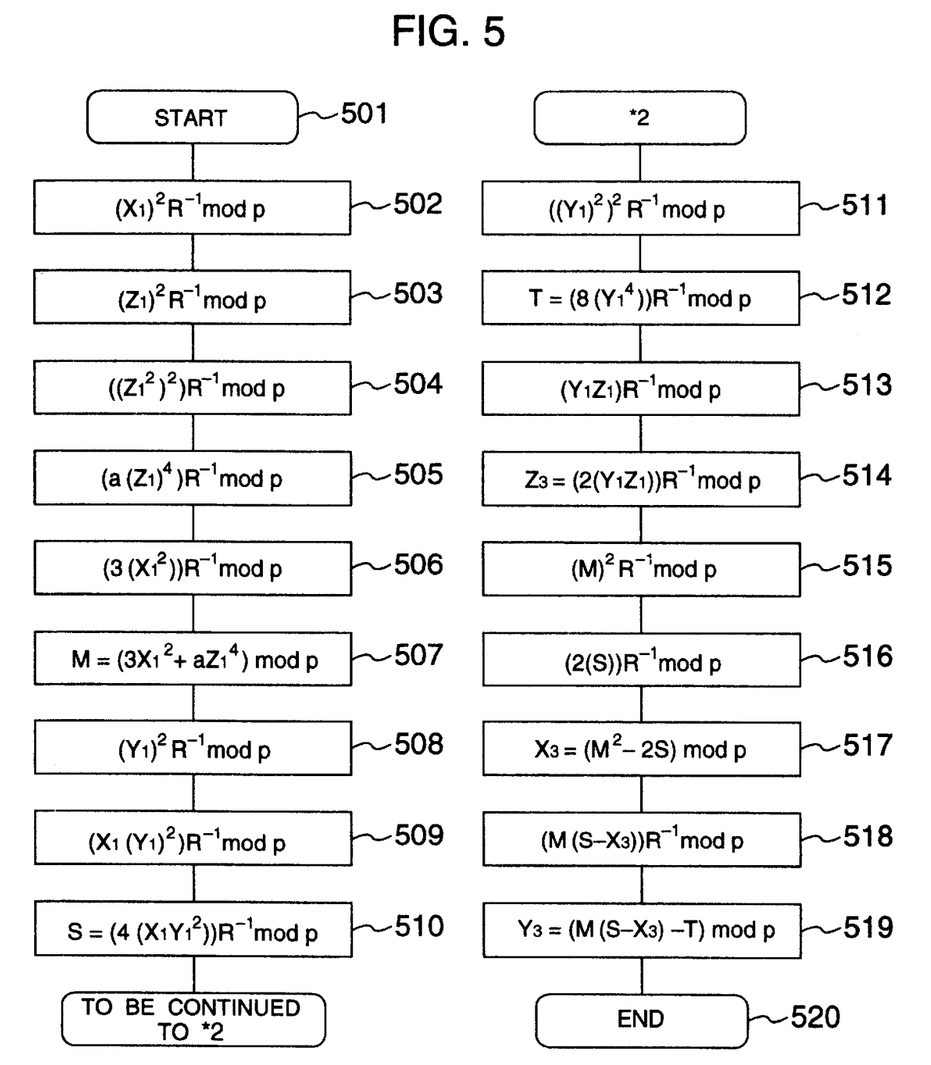
FIG. 5 is a flow chart for illustrating in detail elliptic by-two-multiplication arithmetic in the processing procedure shown in FIG. 3.

FIG. 5 illustrates in detail in a flow chart the elliptic by-two-multiplication arithmetic in the processing procedure described previously by reference to FIG. 3. In the following, contents of the processings in the individual steps shown in FIG. 5 will be described.

Step 501: The processing procedure is started. In this conjunction, it should be mentioned that because p is placed in the register CDN of the residual multiplier 107 in the step 303, residual multiplication arithmetic to modulus p (or modulo p) is performed.

Step 502: The residual arithmetic 2 defined hereinbefore is executed by using the residual multiplier 107.

Step 503: The residual arithmetic 2 is executed by using the residual multiplier 107.

Step 504: The residual arithmetic 2 is executed by using the residual multiplier 107.

Step 505: The residual arithmetic 1 also defined hereinbefore is executed by using the residual multiplier 107.

Step 506: Value "3R mod p" stored in the EEPROM 104 and value "$X_1^2R$ mod p" determined in the step 502 are inputted to the residual multiplier 107 for thereby executing the residual arithmetic 1.

Step 507: The CPU 102 performs the residual addition arithmetic to thereby derive the interim value M.

Step 508: The residual arithmetic 2 is executed by using the residual multiplier 107.

Step 509: The residual arithmetic 1 is executed by using the residual multiplier 107.

Step 510: Value "4R mod p" stored in the EEPROM 104 and value "$X_1Y_1^2R$ mod p" determined in the step 509 are inputted to the residual multiplier 107 for thereby executing the residual arithmetic 1, whereby an interim value S is determined.

Step 511: The residual arithmetic 2 is executed by using the residual multiplier 107.

Step 512: Value "8R mod p" stored in the EEPROM 104 and value "$Y_1^4R$ mod p" determined in the step 511 are inputted to the residual multiplier 107 to thereby perform the residual arithmetic 1, whereby the interim value T can be obtained.

Step 513: The residual arithmetic 1 is executed by using the residual multiplier 107.

Step 514: Value "2R mod p" stored in the EEPROM 104 and value "$Y_1Z_1R$ mod p" determined in the step 513 are inputted to the residual multiplier 107 to thereby execute the residual arithmetic 1, whereby the Z-coordinate of the point determined after the elliptic by-two-multiplication arithmetic can be obtained.

Step 515: The residual arithmetic 2 is executed by using the residual multiplier 107.

Step 516: Value "2R mod p" stored in the EEPROM 104 and the interim value S are inputted to the residual multiplier 107 to thereby execute the residual arithmetic 1.

Step 517: The CPU 102 performs the residual subtraction arithmetic to thereby derive the X-coordinate of the point determined after the elliptic by-two-multiplication arithmetic.

Step 518: The residual arithmetic 1 is executed by using the residual multiplier 107.

Step 519: The CPU 102 performs the residual subtraction arithmetic to thereby derive the Y-coordinate of the point determined after the elliptic by-two-multiplication arithmetic.

Step 520: The processing comes to an end.

Figure 6:
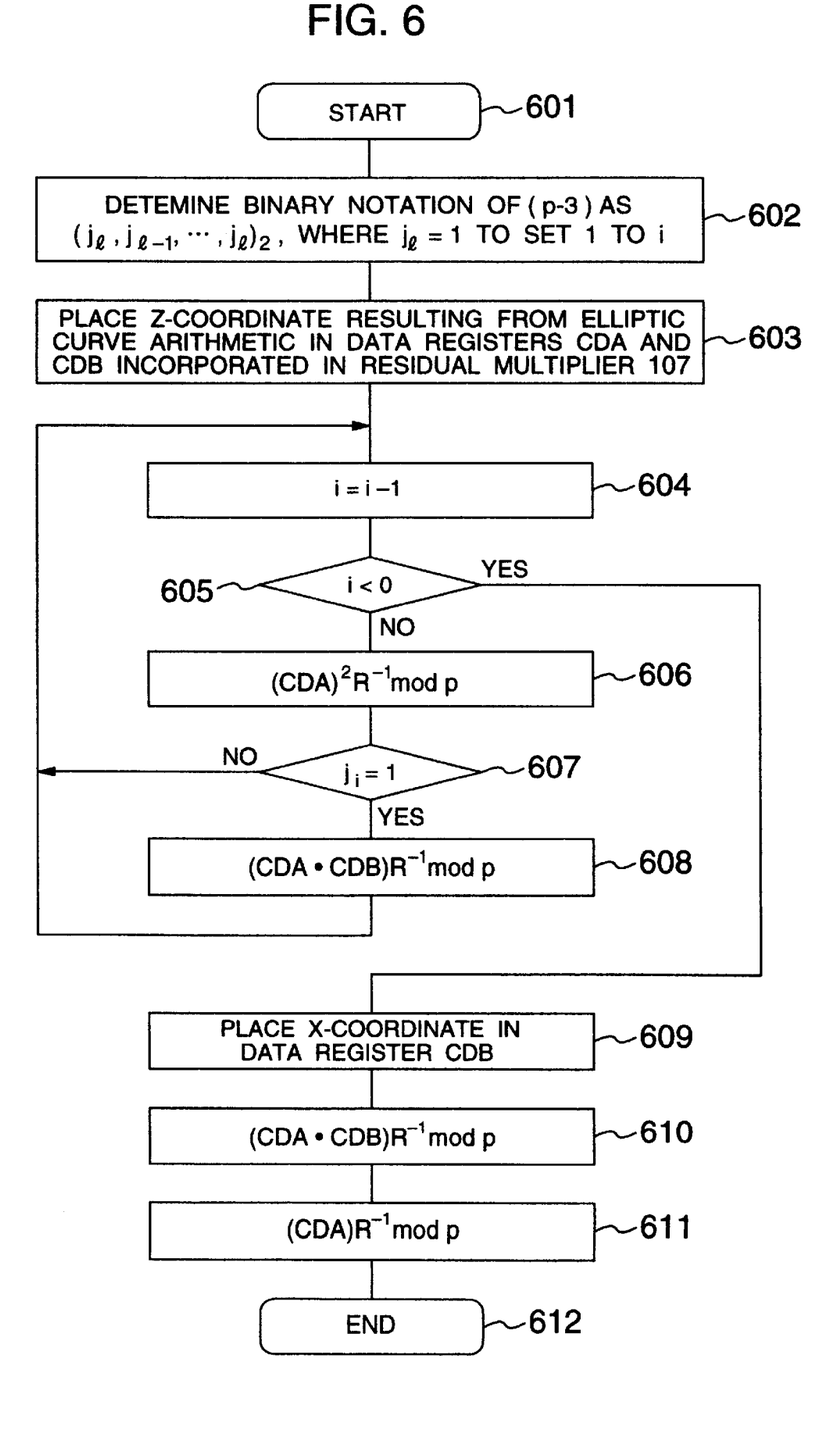
FIG. 6 is a flow chart for illustrating in detail a sequence of processings in a step 204 shown in FIG. 2.

FIG. 6 is a flow chart for illustrating in detail the processing in the step 204 shown in FIG. 2. In the following, contents of the processings in the individual steps shown in FIG. 6 will be described by following the sequence.

Step 601: The processing procedure is started.

Step 602: On the basis of the finite field order p stored in the EEPROM 104, computation for determining (p−3) is performed. In that case, in the binary notation of (p−3) given by $(p-3)=(j_l, j_{l-1}, \ldots, j_1, j_0)_2$, where $j_l=1$, the value of l is stored in the loop counter i as the information indicating the number of times the residual multiplication arithmetic is to be repeated.

Step 603: The Z-coordinate of the point determined by the arithmetic operation in the step 203 is stored in the data registers CDA and CDB incorporated in the residual multiplier 107. On the other hand, the value of p is stored continuously in this data register CDN of the residual multiplier 107, because the value of p stored in the data register CDN in the step 303 is held unchanged.

Step 604: The loop counter value i is decremented by one.

Step 605: Decision is made as to the loop counter value i. If the loop counter value i is smaller than 0 (zero), then the processing proceeds to a step 609 and, if otherwise, to a step 606.

Step 606: The residual arithmetic 2 defined hereinbefore is executed by using the residual multiplier 107.

Step 607: Decision is made as to the value $j_i$ for the loop counter value i of (p−3). Unless the value $j_i$ is equal to 1 (one), the step 604 is resumed. If otherwise, the processing proceeds to a step 608.

Step 608: The residual arithmetic 1 is executed by using the residual multiplier 107, whereon the step 604 is resumed.

Step 609: The X-coordinate of the point determined by the arithmetic operation in the step 203 is stored in the data register CDB incorporated in the residual multiplier 107. At this time point, the value "$Z^{p-3}R$ mod p" is stored in the data register CDA.

Step 610: The residual arithmetic 1 is executed by means of the residual multiplier 107. As a result of this, there is stored in the data register CDA the value "$XZ^{p-3}R$ mod p", i.e., the value given by "$xR \equiv XZ^{-2}R$ (mod p)" resulting from transformation of the X-coordinate of the two-dimensional affine coordinate system obtained after the execution of the step 203 into an operation range of the residual multiplier.

Step 611: The residual arithmetic 3 is executed by using the residual multiplier 107. As a result of this, there is stored in the data register CDA the value "$XZ^{-2}$ mod p", i.e., the value of the X-coordinate given by "$x \equiv XZ^{-2}$ (mod p)" of the two-dimensional affine coordinate system obtained after execution of the step 203. In the steps 604 to 608 described above, $1/Z^2$ is transformed into the multiplicative inverse $Z^{-2}$ for determining $1/Z^2$ in the operation for determining $X/Z^2$, whereupon the value of $X/Z^2$ is determined by the residual multiplier 107.

Step 612: The processing now comes to an end.

As is apparent from the foregoing, in the scheme or system taught by the present invention, the multiple length residual multiplication arithmetic function of the residual multiplier 107 is made use of. Thus, there arises no necessity of performing the multiple length residual multiplication arithmetic by using the CPU 102. Consequently, the number of the arithmetic processing steps can be decreased, which in turn means that the processing speed can be increased.

Figure 7:
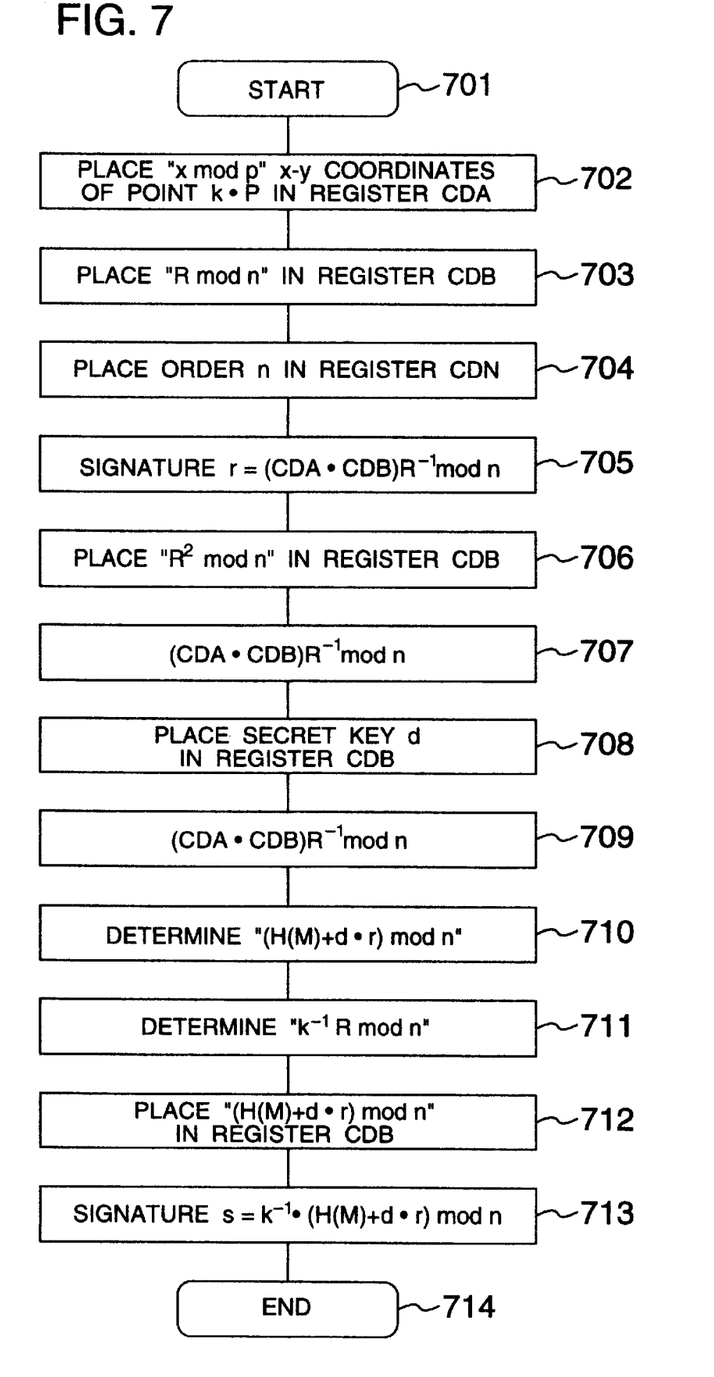
FIG. 7 is a flow chart for illustrating in detail a sequence of processings in a step 205 shown in FIG. 2.

FIG. 7 is a flow chart for illustrating in detail the processing in the step 205 shown in FIG. 2. In the following, contents of the processings in the individual steps shown in FIG. 7 will be described.

Step 701: The processing procedure is started.

Step 702: The value "x mod p" of the X-coordinate of k·P calculated in the step 204 is stored in the data register CDA of the residual multiplier 107.

Step 703: The value "R mod n" stored in the EEPROM 104 is placed in the data register CDB of the residual multiplier 107. Parenthetically, R represents a value inherent to the co-processor and n represents order of the base point P on the elliptic curve.

Step 704: The order n of the base point stored in the EEPROM 104 is placed in the data register CDN of the residual multiplier 107.

Step 705: The residual arithmetic 1 defined hereinbefore is executed by means of the residual multiplier (co-processor) 107. This result is held in the data register CDA where the value "x mod n" is stored which represents the signature given by "r≡x (mod n)". In succession, the processing proceeds to steps 706 to 713 for determining the signature s.

Step 706: The value "$R^2$ mod n" stored in the EEPROM 104 is placed in the data register CDB of the residual multiplier 107.

Step 707: The residual arithmetic 1 defined hereinbefore is executed by means of the residual multiplier 107. As a result of this, the value "rR mod n" is determined to be stored in the data register CDA.

Step 708: The secret key d stored in the EEPROM 104 is placed in the data register CDB of the residual multiplier 107 in response to activation of the IC card by a signer.

Step 709: The residual arithmetic 1 is executed by means of the residual multiplier 107 in response to the activation of the IC card by the signer. As a result of this, the value "dr mod n" is determined to be stored in the data register CDA.

Step 710: A sum of the hash value H(M) for the message M and the value "d·r mod n" determined in the aforementioned step 709 is determined, whereon the value "(H(M)+d·r) mod n" is stored in the RAM 106.

Step 711: The multiplicative inverse "$k^{-1}R$ mod n" is calculated through the residual multiplication arithmetic given by "$k^{n-2}R$ mod n" with the residual multiplier 107. Concerning the calculation method to this end, reference should be made to the processing routine extending from the steps 601 to 609 inclusive. The above calculation will result in a value "$k^{-1}R$ mod n" which is stored in the data register CDA incorporated in the residual multiplier 107.

Step 712: The value "(H(M)+d·r) mod n" stored in the RAM 106 in the step 710 is placed in the data register CDB of the residual multiplier 107.

Step 713: The residual arithmetic 1 defined hereinbefore is executed by means of the residual multiplier 107. As a result of this, the value "$k^{-1} \cdot (H(M)+d \cdot r) \mod n$" can be determined to be stored in the data register CDA, whereon this value is outputted as the signature $s \equiv k^{-1} \cdot (H(M)+d \cdot r) \pmod n$.

Step 714: The processing comes to an end.

With a view to confirming the effects which can be achieved with the present invention, a program conforming to the processing procedure described above in conjunction with the illustrative embodiment of the invention was prepared and the execution time was measured with the operation clock of the CPU being set to 5 MHz.

More specifically, k·P operation on the elliptic curve of 160-bit key length was performed in the three-dimensional projective coordinate system by using 80 reference tables each indicating a value of a point corresponding to by-4-exponentiation of a base point. Furthermore, the multiplicative inverse was realized on the basis of combination of the Fermat's theorem and the binary operation method. For execution, Hitachi microcomputer model No. H8/3111 emulator for an IC card incorporating a multiple length remainder multiplication arithmetic co-processor was employed with assembler being used as the program language. The result of experiment shows that the signature generating time (i.e., time taken for execution of the steps 201 to 206 inclusive) through the 160-bit key length elliptic curve encryption method is 0.308 sec/signature.

As is apparent from the foregoing description, the residual multiplication arithmetic and the residual division arithmetic are performed by using the residual multiplier with the residual addition arithmetic and the residual subtraction arithmetic being executed by the CPU while referencing the values determined previously and stored in a memory. Thus, according to the present invention, the elliptic curve encryption processing can be executed at a very high speed.

Although the foregoing description has been made with emphasis being put on the digital signature generating processing, the present invention is never restricted to the digital signature generating processing. It goes without saying that the teachings of the present invention can equally find application to signature verifying processing and cipher generating processing with enhanced processing speed.

Furthermore, the present invention is never restricted to the IC card. The teachings of the present invention can equally be applied to a device incorporating the CPU of a limited processing capability and a multiplier. Accordingly, the phrase "IC card" used herein should be so interpreted as to cover such device as mentioned just above. By way of example, the teachings of the present invention can be applied to a microcontroller designed for carrying out authentication processing, IEEE 1394 LSI for encryption processing. Such applications are mentioned in NIKKEI ELECTRONICS, No. 732, Dec. 14, 1998, pp. 27 to 28.

Although it has been described that the EEPROM is employed as the rewritable nonvolatile memory 104, the present invention is never restricted thereto. The flash memory known in the art can equally employed as the rewritable nonvolatile memory. Besides, the ROM 103 may be implemented by using a flash memory. Additionally, the multiplicative inverse arithmetic module in which the residual multiplier 107 shown in FIG. 1 is employed may be implemented as a single integrated unit or a combination of components in the form of software such as medium adapted to be read by the processor or in the form of hardware. The multiplicative inverse arithmetic module can ensure wide variety of applications regardless of general-purpose application or destined purpose application.

As will now be appreciated from the foregoing description, according to the present invention, the digital signature generating processing based on the elliptic curve can be realized efficiently by making use of the residual multiplication arithmetic effectively. Thus the present invention has provided a method and device which allows the digital signature generating processing to be executed at a high speed in a device equipped with a residual multiplier.

Many modifications and variations of the present invention are possible in the light of the above techniques. It is therefore to be understood that within the scope of the appended claims, the invention may be practiced otherwise than as specifically described.

What is claimed is:

1. A multiplicative inverse arithmetic module destined for use in an encryption processing unit embodied in a computer processing system including a residual multiplier, for performing an arithmetic operation given by "$k^{-1} \mod n$" on a positive integer k which is to be generated and which is relatively prime to a prime number n, comprising:

a first register and a second register residing in the computer processing system;

first means for performing residual multiplication arithmetic of multiplying a value of said first register and a value of said second register to module n, using said residual multiplier, the arithmetic result of which is set in said first register, while maintaining said second register unchanged in its value;

second means for performing residual multiplication arithmetic of squaring the value set in said first register to module n, using said residual multiplier, the arithmetic result of which is set in said first register; and third means cooperative with said first means and said second means for performing a process for obtaining "$k^{(n-2)} \mod n$" equaling "$k^{-1} \mod n$" from said positive integer k.

2. A multiplicative inverse arithmetic module according to claim 1, wherein said residual multiplier is constituted by a co-processor.

3. A semiconductor chip according to claim 2, comprising:

a multiplicative inverse arithmetic module.

4. An IC card including an encryption processing unit according to claim 3, wherein said IC card includes a semiconductor chip packaging a multiplicative inverse arithmetic module.

5. A multiplicative inverse arithmetic module according to claim 1, wherein said third means executes the steps comprising:

a first step of causing said first register and said second register to be set with said positive integer k as an initial value and operating said second means;

a second step of operating said first means to use the arithmetic result of said second means as an arithmetic object;

a third step of operating said second means to use the arithmetic result of said first means as an arithmetic result of said first means as an arithmetic object; and a fourth step of repeating said second step and said third step to obtain "$k^{(n-2)} \mod n$" from the arithmetic result.

6. A multiplicative inverse arithmetic module according to claim 1, wherein said residual multiplier further multiplies the result of said residual multiplication arithmetic by $R^{-1}$ where $R^{-1}$ is a constant, the result of which is applied as said arithmetic result to be set in said first register.

* * * * *